United States Patent [19]

Lohmeijer et al.

[11] Patent Number: 4,618,637
[45] Date of Patent: Oct. 21, 1986

[54] POLYMER MIXTURE WHICH COMPRISES A POLYPHENYLENE ETHER AND A DIHYDRAZIDE AS A STABILIZER

[75] Inventors: Johannes H. G. M. Lohmeijer, Hoogerheide; Jacobus W. M. Noordermeer, Nieuwstadt/Susteren; Jan Bussink, Bergen op Zoom, all of Netherlands

[73] Assignee: General Electric Company, Selkirk, N.Y.

[21] Appl. No.: 809,553

[22] Filed: Dec. 16, 1985

[30] Foreign Application Priority Data

Dec. 20, 1984 [NL] Netherlands ............... 8403863

[51] Int. Cl.$^4$ ............................................. C08K 5/25
[52] U.S. Cl. .................................... 524/192; 524/191; 524/193
[58] Field of Search ..................... 524/191, 192, 193

[56] References Cited

U.S. PATENT DOCUMENTS

| | | | |
|---|---|---|---|
| 3,117,104 | 1/1964 | Bown et al. | 524/192 |
| 3,639,334 | 1/1972 | Holoch | 524/151 |
| 3,952,072 | 4/1976 | Yonemitsu et al. | 524/192 |
| 3,954,904 | 5/1976 | Yonemitsu et al. | 524/191 |
| 4,489,186 | 12/1984 | Sugio et al. | 524/217 |

FOREIGN PATENT DOCUMENTS 2451929  5/1975  Fed. Rep. of Germany.

*Primary Examiner*—Veronica P. Hoke
*Attorney, Agent, or Firm*—Michael J. Doyle

[57] ABSTRACT

The invention relates to polymer mixtures which comprise a polyphenylene ether which have been stabilized with oxalyldihydrazide against oxidative degradation.

4 Claims, No Drawings

POLYMER MIXTURE WHICH COMPRISES A POLYPHENYLENE ETHER AND A DIHYDRAZIDE AS A STABILIZER

The invention relates to a polymer mixture which comprises a polyphenylene ether and a dihydrazide as a stabilizer.

Polymer mixtures which comprise a polyphenylene ether and a dihydrazide stabilizer are disclosed in U.S. Pat. No. 3,639,334. According to this prior art, a hydrazine, for example, adipic acid dihydrazide, may be added to polyphenylene ether to increase the stability of the polyphenylene ether in an oxidizing atmosphere.

U.S. Pat. No. 3,954,904 discloses polymer mixtures which comprise a polyphenylene ether, a polystyrene and a substituted dicarboxylic acid dihydrazide as a stabilizer. As a comparative example, said Patent Specification describes the use of adipic acid dihydrazide as a stabilizer.

German Patent Application No. 31 18 616 describes polymer mixtures which comprise a high-impact polystyrene, a polyphenylene ether and a metal deactivator. The high-impact polystyrene may comprise a saturated rubber, for example, an acrylate rubber or an EPDM rubber.

The metal deactivator is added to stabilize the polymer mixture against ageing under atmospheric influence. As a metal deactivator may be used hydrazines, for example, N,N-bis[3-(3',5'-ditert.butyl-4'-hydroxyphenyl)-propionyl]hydrazine.

The invention is based on the discovery that a given dihydrazide has a better stabilizing activity against oxygen than the above-mentioned stabilizers. The polymer mixture according to the invention is characterized in that it comprises 0.05–5 parts by weight of oxalyldihydrazide as a stabilizer per 100 parts by weight of polyphenylene ether.

German Patent Application No. 24 51 929 claims the use of substituted dicarboxylic acid dihydrazides as stabilizer for polyphenylene ethers. In the text (page 8, lines 21–25) has been stated that "dicarboxylic acid-dihydrazide can improve the thermal stability of molded polyphenylene ether resins as well as the stability during the molding process, but the molded product is discolored and the appearance has become worse to a considerable extent". This text does not refer to a specific dicarboxylic acid-dihydrazide. Since oxalyldihydrazide as claimed in the present application doesn't show the mentioned disadvantages the German application refers to another dicarboxylic acid-dihydrazide.

The polymer mixture according to the invention may comprise a polymer of a vinylaromatic compound. In that case, the polymer mixture preferably comprises 5–95 parts by weight of polyphenylene ether, 95–5 parts by weight of a polymer of a vinylaromatic compound, and 0.05–5 parts by weight (per 100 parts by weight of polyphenylene ether) of oxalyldihydrazide. As a polymer of a vinylaromatic compound, the polymer mixture according to the invention may comprise a rubber-modified polystyrene. The polystyrene may be modified with saturated rubbers, for example, acrylate rubbers and EPDM-rubber or with unsaturated rubbers, for example, butadiene rubbers.

The polymer mixture according to the invention comprises a polyphenylene ether. Polyphenylene ethers are compounds known per se. For this purpose, reference may be made to the U.S. Pat. Nos. 3,306,874; 3,306,875; 3,257,357; and 3,257,358. Polyphenylene ethers are usually prepared by an oxidative coupling reaction—in the presence of a copper amine complex—of one or more two-fold or three-fold substituted phenols, homopolymers and copolymers, respectively, being obtained. Copper amine complexes derived from primary, secondary and/or tertiary amine may be used. Examples of suitable polyphenylene ethers are:

poly(2,3-dimethyl-6-ethylphenylene-1,4-ether)
poly(2,3,6-trimethylphenylene-1,4-ether)
poly(2,4'-methylphenylphenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers, are also suitable. Furthermore, homopolymeric and copolymeric polyphenylene ethers on which a vinylaromatic compound, for example, styrene, has been grafted, are suitable.

The polymer mixture according to the invention comprises oxalyldihydrazide as a stabilizer. It has been found that said dihydrazide has a better stabilizing activity than the known adipic acid dihydrazide.

The polymer mixture according to the invention may comprise a polymer of a vinylaromatic compound. In that case the polymer mixture usually comprises 5–95 parts by weight of polyphenylene ether, 95–5 parts by weight of a polymer of a vinylaromatic compound, and 0.05–5 parts by weight (per 100 parts by weight of polyphenylene ether) of oxalyldihydrazide. As a polymer of a vinylaromatic compound may be used, for example, homopolymers, for example, polystyrene and polychlorostyrene, as well as polystyrenes which are modified with natural or synthetic rubber, for example, polybutadiene, polyisoprene, butylacrylate rubber, EPDM rubber, ethylene-propylene copolymers, natural rubber, polysulphide rubbers, polyurethane rubbers, silicones, epichlorohydrin and the like, styrene-containing copolymers, for example, styrene acrylonitrile copolymers (SAN), styrene-butadiene copolymers, styrene-maleic acid anhydride copolymers, styrene-acrylonitrile-butadiene terpolymers (ABS), poly-alpha-methylstyrene, copolymers of ethylvinyl benzene and divinyl benzene and the like; block copolymers of the A-B-A and A-B types in which A is polystyrene and B is an elastomeric diene, for example polybutadiene, radial teleblock copolymers of styrene and a conjugated diene, acryl resin-modified styrene-butadiene resins and the like, and mixtures of homopolystyrene and copolymers of the above-mentioned types.

The polymer mixture according to the invention may comprise in addition any usual additive, for example, pigments, dyes, fillers, flame-retarding agents, plasticizers, antistatics, usual stabilizers, means to increase the impact strength, agents to reduce the sensitivity to crack formation under load in the presence of organic solvents, for example, metal salts of organic sulphonic acids, antioxidants, for example, organic phosphites, hindered amines, organic sulphur compounds and sterically hindered phenols.

The polymer mixture according to the invention may be prepared in a conventional manner. Usually, the various constituents are mixed in an extruder and processed to a granulate. The granulate may be processed according to the conventional techniques for thermoplastic materials, for example, injection moulding.

The invention will now be described with reference to the ensuing examples. Examples I, II and III and comparative examples 1 to 6 inclusive.

Polymer mixtures were prepared by means of extrusion (at 280° C.) and consisted of:

45 parts by weight of poly(2,6-dimethyl-1,4-phenylene ether), (with an intrinsic viscosity of 0.48 dl/g in toluene at 25° C.), 55 parts by weight of high-impact polystyrene based on polybutadiene and one or more of the following constituents (as indicated in more detail in Table I)

A: a mixture of decyldiphenylphosphite and tris(nonylphenyl)phosphite,

B: oxalyldihydrazide

C: adipic acid dihydrazide

D: 2,2′-methylene-bis-(4-methyl-6-t-butyl)phenol.

The resulting granulate was placed in a glass tube and—after connecting to a gas burette—rinsed with oxygen. After closing, the tube was heated to a constant temperature of 124° C. The quantity of oxygen taken up per gram of granulate was determined after 100 hours, after 200 hours and after 350 hours. A small take-up of oxygen indicates a high stability against thermo-oxidative degradation.

The results obtained and the composition of the polymer mixtures are recorded in Table I.

TABLE I

| Example No. | Additives (parts by weight) | Oxygen take-up (ml O2/g of granulate) at 124° C. in 100% O2 after: | | |
|---|---|---|---|---|
| | | 100 hours | 200 hours | 350 hours |
| 1 | — | 17.8 | 24.8 | 33.0 |
| 2 | A (0.5) | 15.6 | 23.5 | 32.8 |
| 3 | C (0.25) | 5.0 | 13.3 | 26.6 |
| 4 | D (0.5) | 7.9 | 23.8 | 32.1 |
| 5 | A (0.5) + C (0.25) | 5.8 | 13.0 | 25.6 |
| 6 | C (0.25) + D (0.5) | 2.2 | 6.2 | 16.0 |
| I | B (0.25) | 3.7 | 10.6 | 24.5 |
| II | A (0.5) + B (0.25) | 2.8 | 12.5 | 23.3 |
| III | B (0.25) + D (0.25) | 1.0 | 4.2 | 11.4 |

Comparison of Example I with Example 3, of Example II with Example 5 and of Example III with Example 6 shows clearly that oxalyldihydrazide (additive B) has a better stabilizing activity than the known stabilizing compound adipic acid dihydrazide (Additive C). The synergistic effect of additive D (a sterically hindered phenol) is also striking.

EXAMPLES IV, V, AND VI AND EXAMPLES 7 TO 12 INCLUSIVE

The method according to the previous examples was repeated in which, however, a high-impact polystyrene based on an EPDM-rubber was used. The oxygen take-up was much slower and in these examples was measured after 250 hours, 500 hours and 1,000 hours.

The quantity and the nature of the additives and the results obtained are recorded in Table II.

TABLE II

| Example No. | Additives (parts by weight) | Oxygen take-up (ml O2/g of granulate) at 124° C. in 100% O2 after: | | |
|---|---|---|---|---|
| | | 250 hours | 500 hours | 1000 hrs |
| 7 | — | 5.7 | 10.2 | 20.3 |
| 8 | A (0.5) | 5.1 | 8.9 | 24.7 |
| 9 | C (0.25) | 3.9 | 7.5 | 18.0 |
| 10 | D (0.5) | 5.2 | 8.1 | 25.1 |
| 11 | A (0.5) + C (0.25) | 4.0 | 8.7 | 23.8 |
| 12 | C (0.25) + D (0.5) | 3.5 | 7.5 | 18.7 |
| IV | B (0.25) | 3.5 | 7.2 | 16.6 |
| V | A (0.5) + B (0.25) | 3.0 | 6.3 | 15.4 |
| VI | B (0.25) + D (0.5) | 3.0 | 6.3 | 15.4 |

In this case also the polymer mixtures according to the invention (Examples IV, V and VI) have a better thermo-oxidative stability than the prior art polymer mixtures (Examples 7 to 12 inclusive).

We claim:

1. A polymer mixture which comprises a polyphenylene ether and a dihydrazide as an antioxidant stabilizer, characterized in that per 100 parts by weight of polyphenylene ether the polymer mixture comprises 0.05–5 parts by weight of oxalyldihydrazide as the stabilizer.

2. A polymer mixture as claimed in claim 1, characterized in that the polymer mixture comprises 5–95 parts by weight of polyphenylene ether, 95–5 parts by weight of a polymer of a vinylaromatic compound, and 0.05–5 parts by weight, per 100 parts by weight of polyphenylene ether, of oxalyldihydrazide.

3. A polymer mixture as claimed in claim 2, characterized in that the polymer mixture comprises in addition a saturated rubber-modified polymer of a vinylaromatic compound.

4. A polymer mixture as claimed in claim 1, charcterized in that the polymer mixture comprises in addition a sterically hindered phenol compound as an anti-oxidant.

* * * * *